(12) United States Patent  
Gregerson

(10) Patent No.: US 8,967,473 B2
(45) Date of Patent: Mar. 3, 2015

(54) SCANNER, METHOD AND SYSTEM FOR PROCESSING IMAGES IN AN IMAGING BASED OPTICAL CODE SCANNER

(75) Inventor: David L. Gregerson, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 79 days.

(21) Appl. No.: 13/308,187

(22) Filed: Nov. 30, 2011

(65) Prior Publication Data

US 2013/0134218 A1 May 30, 2013

(51) Int. Cl.
  *G06K 7/00* (2006.01)
  *G06K 7/14* (2006.01)
(52) U.S. Cl.
  CPC .................................. *G06K 7/14* (2013.01)
  USPC .................. 235/440; 235/462.12; 235/462.17

(58) Field of Classification Search
  USPC .................. 235/440, 462.01; 710/22
  See application file for complete search history.

(56) References Cited

U.S. PATENT DOCUMENTS

| 7,809,283 | B2* | 10/2010 | Hahin et al. | 398/195 |
| 7,866,546 | B1* | 1/2011 | Vance | 235/379 |
| 2004/0243739 | A1* | 12/2004 | Spencer | 710/22 |
| 2009/0020612 | A1* | 1/2009 | Drzymala et al. | 235/462.32 |
| 2010/0252635 | A1* | 10/2010 | Drzymala et al. | 235/462.41 |
| 2013/0062505 | A1* | 3/2013 | Masuda | 250/208.1 |

* cited by examiner

*Primary Examiner* — Thien M Le
*Assistant Examiner* — Asifa Habib
(74) *Attorney, Agent, or Firm* — Harden E. Stevens, III; Joseph P. Mehrle

(57) ABSTRACT

A scanner, method and system are provided for processing images captured by an optical code scanner. The optical code scanner includes multiple image sensors each adapted to capture an image of an optical code, and a processor that processes the captured images from the multiple image sensors to read the optical code presented to the optical code scanner.

20 Claims, 6 Drawing Sheets

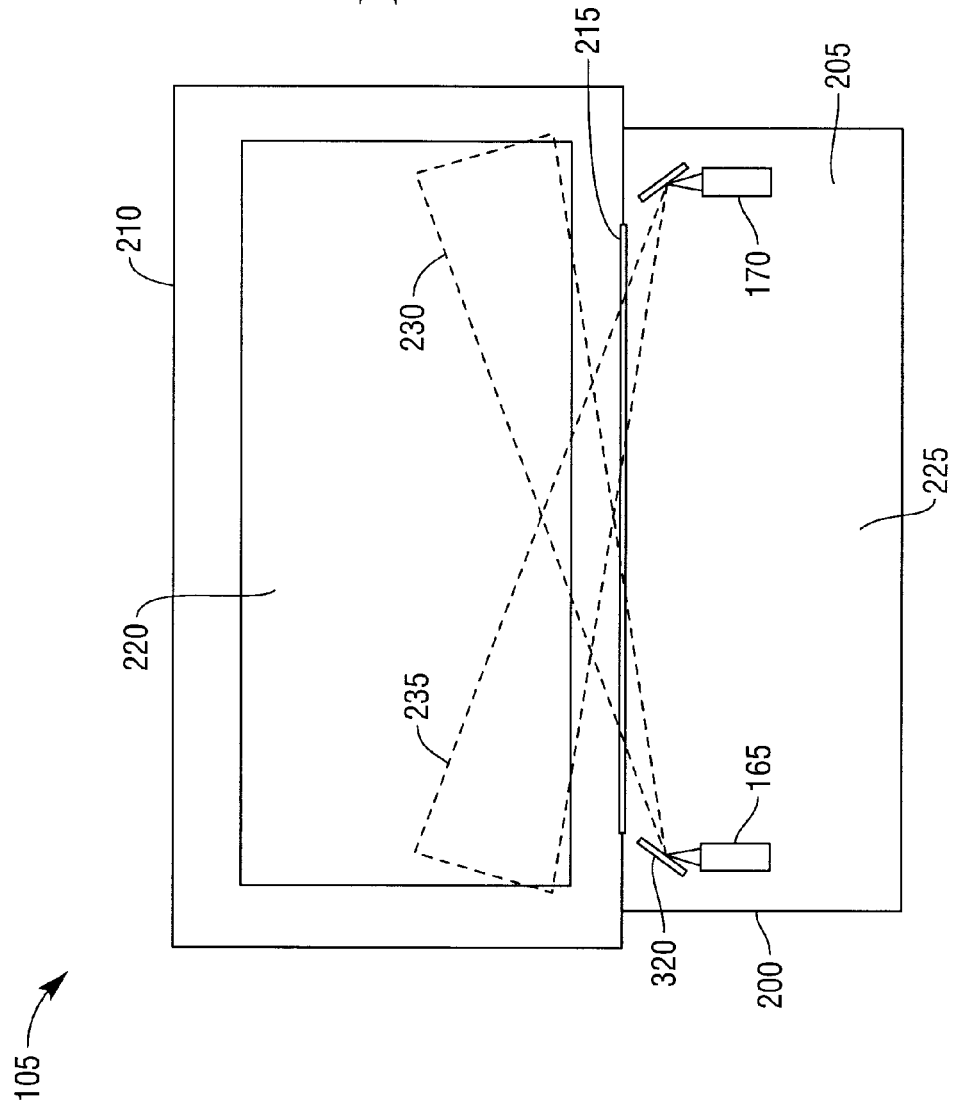

US 8,967,473 B2

SCANNER, METHOD AND SYSTEM FOR PROCESSING IMAGES IN AN IMAGING BASED OPTICAL CODE SCANNER

FIELD OF THE INVENTION

The present invention relates generally to an optical code scanner. More particularly, but not exclusively, the invention relates to processing images from multiple image sensors of an optical code scanner by a single processor.

BACKGROUND

Any discussion of prior art throughout the specification should in no way be considered as an admission that such prior art is widely known or forms part of common general knowledge in the field.

Point of sale (POS) terminals are used throughout the retail industry to process purchase transactions. A POS terminal typically includes a personal computer (PC) core in a chassis, one or more displays, an optical code scanner with weigh scale, a cash drawer, a magnetic stripe reader (MSR), keyboard and a printer. The POS terminals can either be self-service or assisted service.

The optical code scanner includes an imaging scanner. An imaging scanner reads an optical code by capturing an image using an image sensor and then processing the image to recover information encoded in the optical code. To increase an imaging scanner's ability to read optical codes, multiple image sensors can be used. Adding additional image sensors usually means adding a processor for each image sensor to process the images captured by the image sensor. The additional processors add additional expense to the optical code scanner.

Therefore, there is a need to process images from multiple image sensors without adding a processor for each additional image sensor.

SUMMARY OF THE INVENTION

It is an object of the present invention to overcome or ameliorate at least one of the disadvantages of the prior art, or to provide a useful alternative.

Among its several aspects, one embodiment of the present invention recognizes the need to reduce the cost of an image scanner in an optical code scanner by reducing the number of processors required to process images captured by multiple image sensors. In this embodiment, a single processor receives and processes images from multiple image sensors to read an optical code. In another embodiment, the presence of only a portion of an optical code is detected and the processing of images is restricted to images received from an area of the optical code scanner where the portion of the optical code was detected. In still another embodiment, a scan history for an operator using the optical code scanner is used to read certain image sensors more frequently than others because historically these image sensors have been able to read an optical code first.

In accordance with an embodiment of the present invention, there is provided an optical code scanner comprising: a plurality of image sensors each adapted to capture an image of an optical code; a memory adapted to store a program and a captured image of an optical code from one of the plurality of image sensors; and a processor in communication with the plurality of image sensors and the memory where the program when executed by the processor causes the processor to control the optical code scanner including receiving and processing captured images from each of the plurality of image sensors using a round-robin approach until a portion of the optical code is detected.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

FIG. 3B is a high-level cross-sectional drawing illustrating the exemplar embodiment of the optical code scanner looking at the front of the optical code scanner.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The term optical code, as used herein, includes both one and two dimensional barcodes. In addition, two dimensional barcodes include Quick Response (QR) codes and data matrix codes. The term optical code is not intended to be limited to just these examples but include machine readable codes that provide information or identification data.

Figure 1:
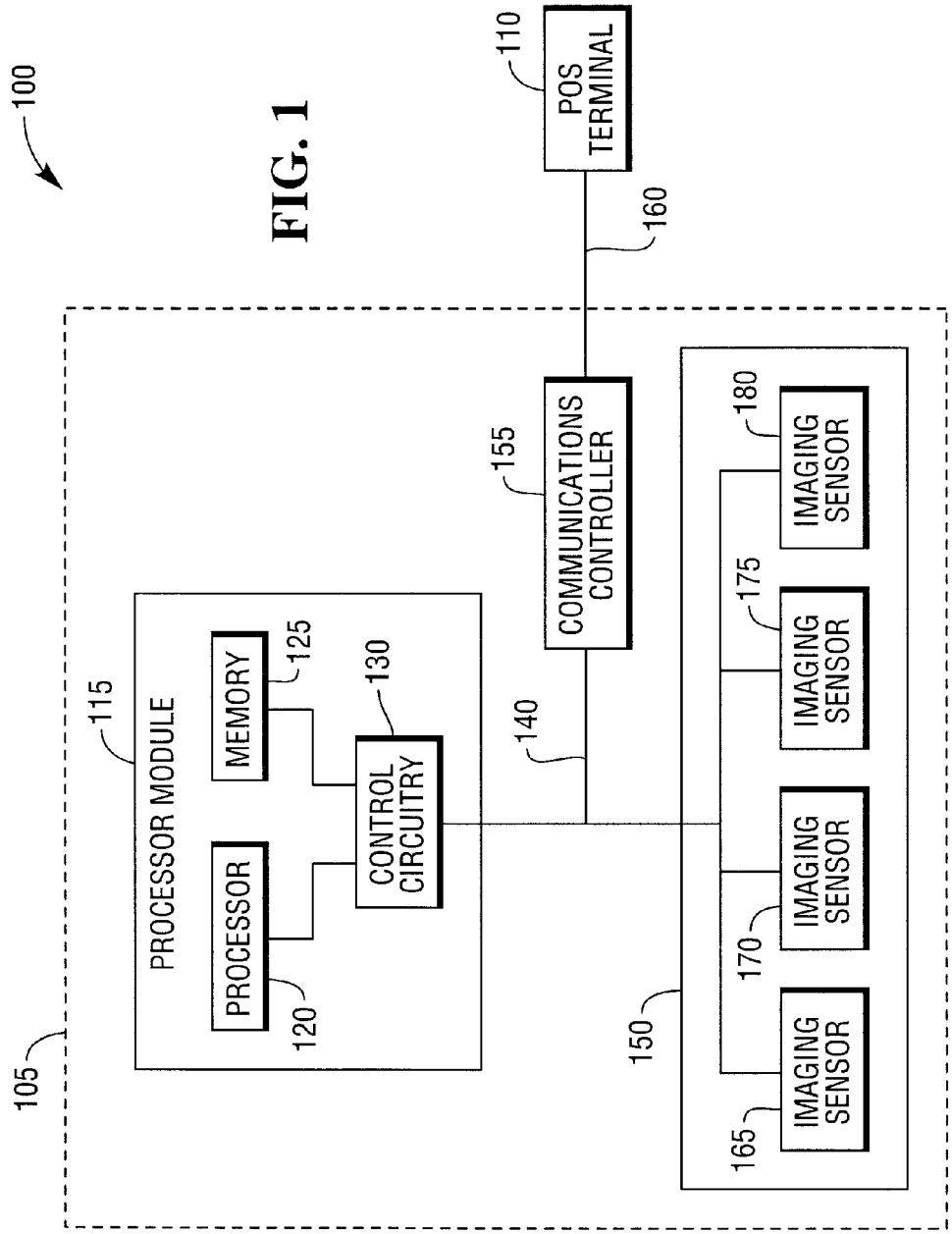
FIG. 1 is a high-level block diagram illustrating an exemplar embodiment of a point of sale system.

Referring now to FIG. 1, there is provided a high-level block diagram illustrating an exemplar embodiment of a point of sale (POS) system 100. The POS system 100 can be either an assisted or self-checkout system. The POS system 100 includes an optical code scanner 105 connected over a data connection 160 to a POS terminal 110. The optical code scanner 105 includes a processor module 115, an imaging scanner 150 and a communications controller 155.

Within the processor module 115, there is included a processor 120, a memory 125 and control circuitry 130. The memory 125 includes both volatile and non-volatile memory. Software stored in the memory 125 is executed by the processor 120 and causes the processor 125 to control the devices and operation of the optical code scanner 105. The control circuitry 130 provides an interface between the processor 120 and the memory 125 and between the processor 120 a data bus 140 used to communicate with other devices that comprise the optical code scanner 105 including but not limited to the imaging scanner 150 and communications controller 155. In some embodiments, all or a portion of the memory 125 is connected directly to the processor 120.

The communications controller 155 includes hardware and software required to communicate with external devices over the data connection 160. In some embodiments, the data connection 160 is implemented using an industry standard USB bus to connect the optical code scanner 105 to the POS terminal 110.

The imaging scanner 150 includes a plurality of image sensors 165, 170, 175, 180. The processor 120 controls each of the image sensors 165, 170, 175, 180 using the bus 140 to issue commands and read captured images from each image sensor. The commands include commands to capture an image or to change one or more parameters of an image sensor. Other embodiments have a plurality of the image sensors but more or less than four imaging sensors.

The image sensors 165, 170, 175, 180 capture an image by converting received light into electrical signals. The electrical signals are then processed by the processor 120 to determine what elements have been captured. The image sensors 165, 170, 175, 180 can be based on charged-coupled technology or CMOS technology.

Figure 2:
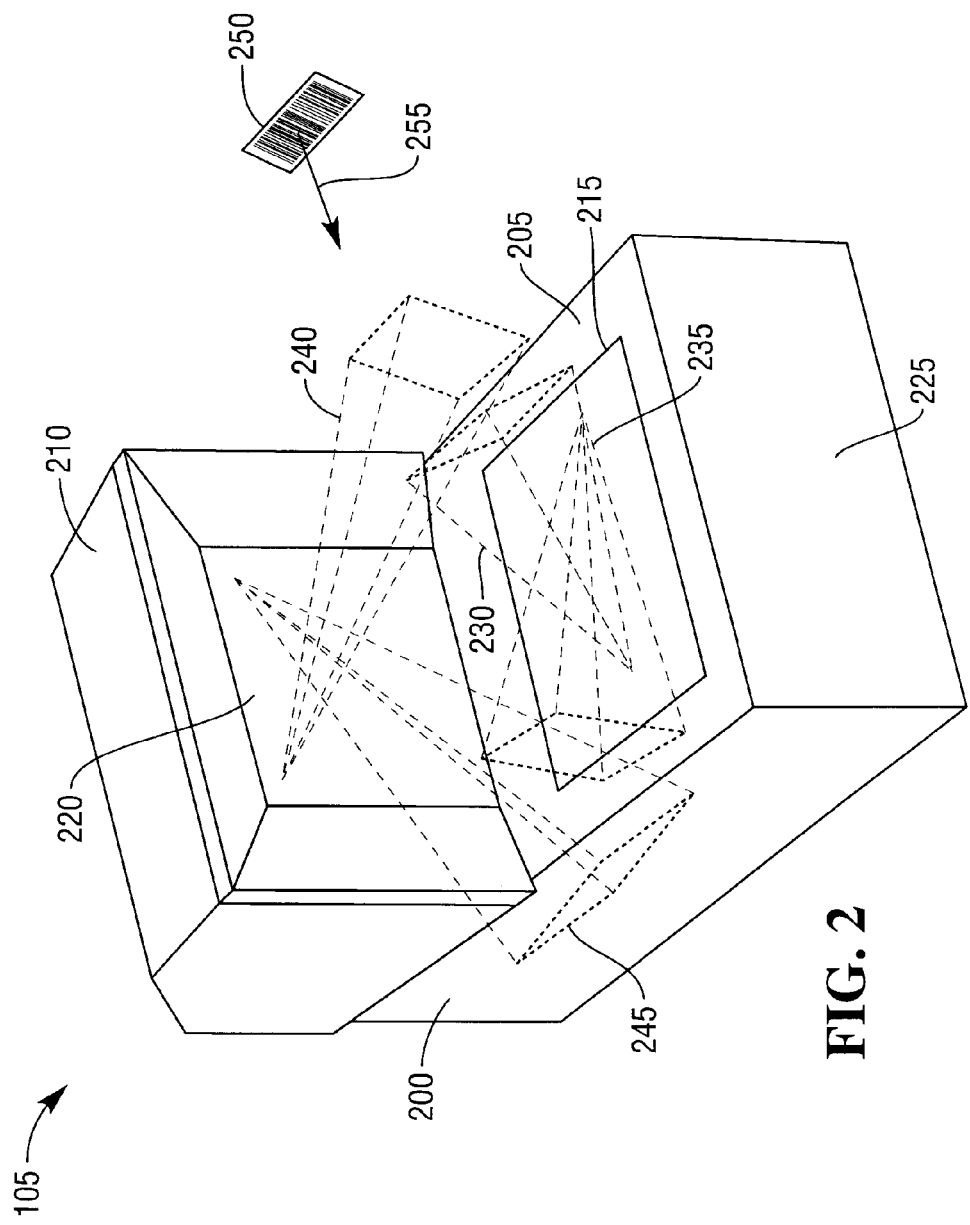
FIG. 2 is a high-level drawing illustrating an exemplar embodiment of an optical code scanner.

Turning to FIG. 2, there is provided a high-level drawing illustrating an exemplar embodiment of the optical code scanner 105. The optical code scanner 105 includes a housing 200 comprising a vertical housing component 210 and horizontal housing component 205. The vertical housing component 210 includes a vertical scanning window 220 and the horizontal housing component 205 includes a horizontal scanning window 215. The vertical scanning window 220 faces the front 225 of the optical code scanner 105. An operator/user of the optical code scanner 105 stands in front 225 of the optical code scanner 105 facing the vertical scanning window 220 and moves an optical code 250 generally above the horizontal scanning window 215 and in front of the vertical scanning window 220.

The right side and left side of the optical code scanner 105 are determined by facing the front 225 of optical code scanner 105.

Two of the image sensors 175, 180 are located inside the vertical housing component 210 and capture images that are received through the vertical scanning window 220. Image sensor 180 receives an image along an image path 240 from the right side of the optical code scanner 105. Image sensor 175 receives an image along an image path 245 from the left side of the optical code scanner 105.

The other two image sensors 165, 170 are located inside the horizontal housing component 205 and capture images that are received through the horizontal scanning window 215. Image sensor 165 receives an image along an image path 230 from the right side of the optical code scanner 105. Image sensor 170 receives an image along an image path 235 from the left side of the optical code scanner 105.

In some embodiments, additional image sensors are used. For example, an image sensor is positioned in the upper center of the vertical scanning window 220 to receive an image from the center area of the horizontal scanning window 215.

Figure 3A:
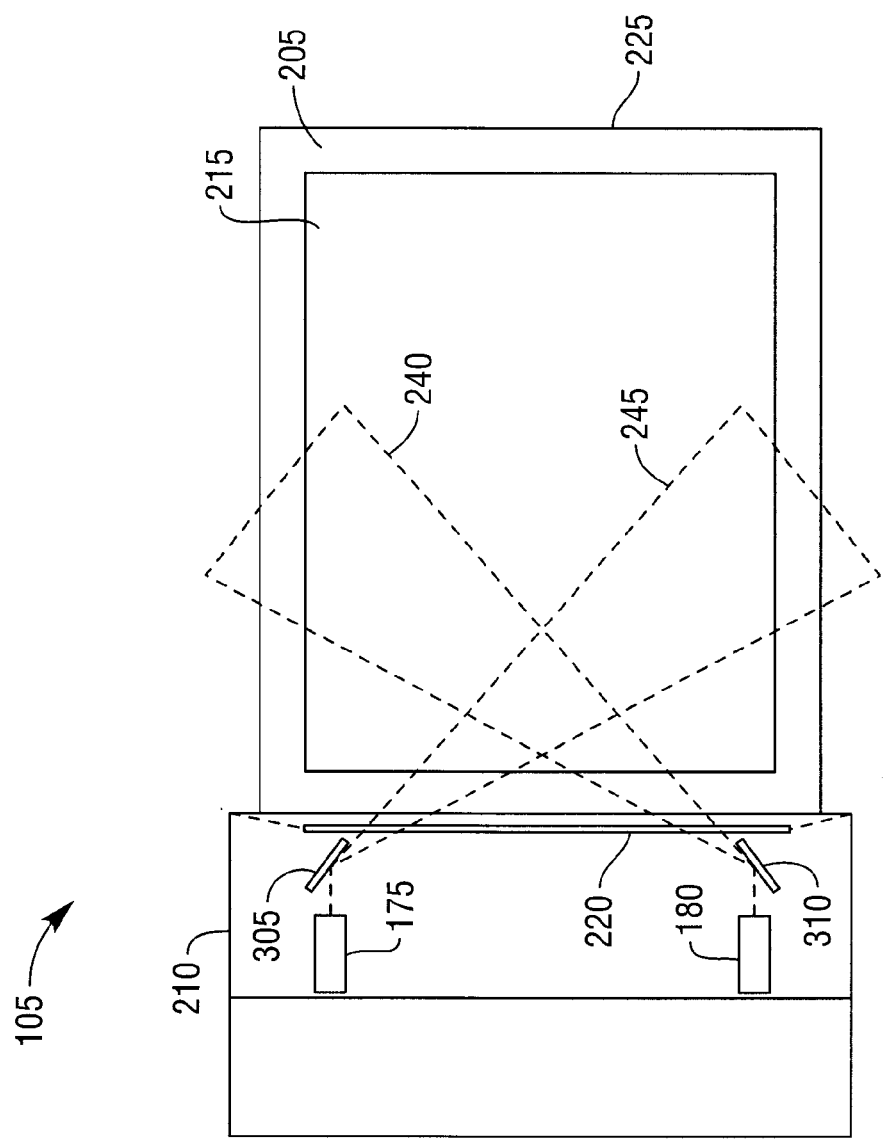
FIG. 3A is a high-level cross-sectional drawing illustrating the exemplar embodiment of the optical code scanner looking down at the optical code scanner.

With reference to FIG. 3A, there is provided a high-level cross-sectional drawing illustrating the exemplar embodiment of the optical code scanner 105 looking down at the scanner 105.

FIG. 3A shows the image sensors 175, 180 located within the vertical housing component 210. These image sensors 175, 180 each receive an image that passes through the vertical scanning window 220. A mirror 310 directs an image from the image path 240 to the image sensor 180. A mirror 305 directs an image from the image path 245 to the image sensor 175. In general, the image paths 240, 245 are defined to capture images of optical codes 250 that are facing upward or toward the vertical scanning window 220 and moving from either side of the optical code scanner 105.

With reference to FIG. 3B, there is provided a high-level cross-sectional drawing illustrating the exemplar embodiment of the optical code scanner 105 looking at the front 225 of the optical code scanner 105.

FIG. 3B shows the image sensors 165, 170 located within the horizontal housing component 205. These image sensors 165, 170 each receive an image that passes through the horizontal scanning window 215. A mirror 320 directs an image from the image path 230 to the image sensor 165. A mirror 315 directs an image from the image path 235 to the image sensor 170. In general, these image paths 230, 235 are defined to capture images of optical codes 250 facing downward or toward the horizontal scanning window 205 and moving from either side of the optical code scanner 105.

In some cases, the orientation of the optical code 205 causes one or more of the image sensors 165, 170, 175, 180 to capture only a portion of the optical code 250. When only a portion of the optical code 250 is captured, it is possible that an image sensor, viewing the same general area but from a different angle, has captured an image of the entire optical code 250. For example, in FIG. 2, the optical code 250 is being moved from right to left 255 across the optical code scanner 105 and is facing generally upward and toward the direction of movement. The image sensor 165 using the image path 230 looks upward through the horizontal scanning window 215 can only capture a portion of the optical code 250. However, the image sensor 180 using the image path 240 looking through the vertical scanning window 220 is able to capture an image of the entire optical code 250. Both of the image sensors 165, 180 have image paths 230, 240 that are directed at the same general area of the optical code scanner 105 but from different angles.

Figure 4:
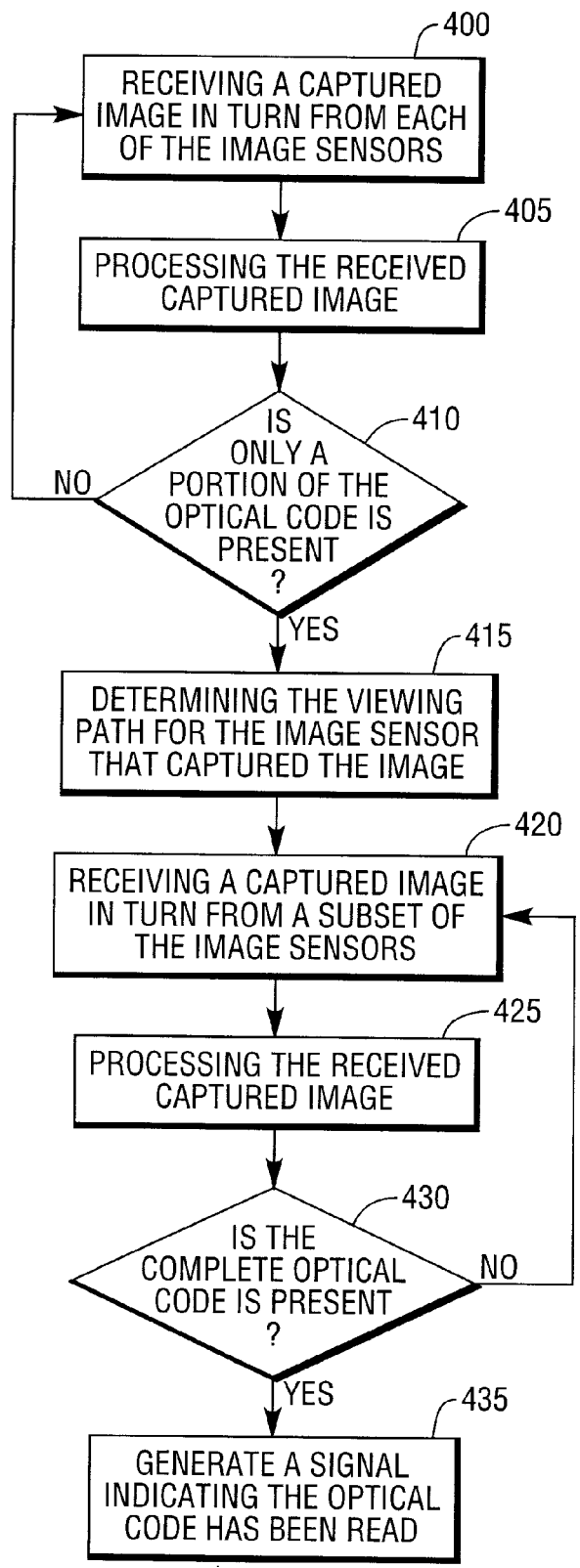
FIG. 4 is a high-level flow chart illustrating an exemplar method for reading an optical code using multiple image sensors and one processor.

Turning to FIG. 4, there is provided a high-level flow chart illustrating an exemplar method for reading an optical code using multiple image sensors using a single processor. In this example, images captured by multiple image sensors 165, 170, 175, 180 are processed by a single processor 120 to read the optical code 250. In step 400, the processor 120 receives in turn a captured image from each of the image sensors 165, 170, 175, 180. The processor 120 will receive only a single captured image from one of the image sensors 165, 170, 175, 180 each time this step is executed. In this step, a round-robin method is used to determine the sequence in which the image sensors 165, 170, 175, 180 are selected for reading a captured imaged. The round-robin method gives equal weighting to each of the image sensors 165, 170, 175, 180 and requires that each of the image sensors 165, 170, 175, 180 is be read once before any of the image sensors 165, 170, 175, 180 can be read a second time.

In step 405, the processor 120 processes the received captured image to determine if only a portion of the optical code 250 is present in the image. As the optical code 250 is being presented to the optical code scanner 105, it possible that only a portion of the optical code 250 is captured in the image. Processing the captured image can determine if only a portion of the optical code 250 is present.

In step 410, if no portion of an optical code 250 is found in the captured image, control transfers back to step 400 where a captured image from a different one of the image sensors 165, 170, 175, 180 is received for processing. If only a portion of the optical code 250 is found, control transfers to step 415. In step 415, the processor 120 determines the viewing path for the image sensor that captured the image containing only the portion of the optical code 250. Each of the image sensors 165, 170, 175, 180 have a defined viewing path. The viewing path for an image sensor defines the direction and general area of the optical code scanner 105 that produces the highest quality image of an object (e.g., optical code 250) when it is located in the area. Also in step 415, the processor 120 identifies a subset of the image sensors 165, 170, 175, 180 that have a viewing path to the same general area of the optical code scanner 105 as the viewing path of the image sensor that captured the portion of the optical code 250. The subset of image sensors includes the image sensor that captured the portion of the optical code 250 and at least one other image sensor whose viewing path passes through a different scanning window than the image sensor that captured the portion of the optical code 250. In some embodiments where only two image sensors are present and they view different areas, the subset of image sensors includes only the image sensor that captured the portion of the optical code 250.

In step 420, the processor 120 receives in turn a captured image from each of the subset of image sensors. The processor 120 uses a round-robin method to read in turn a captured image from one of the subset of image sensors.

In step 425, the processor 120 processes the received captured image and determines if a complete optical code 250 has been captured. In step 430, if a complete optical code 250 has not been captured, control is transferred back to step 420. If a complete optical code 250 has been captured, control is transferred to step 435. In step 435, the processor 120 generates a signal indicating the optical code 250 has been read. The signal includes information read from the optical code 250.

Figure 5:
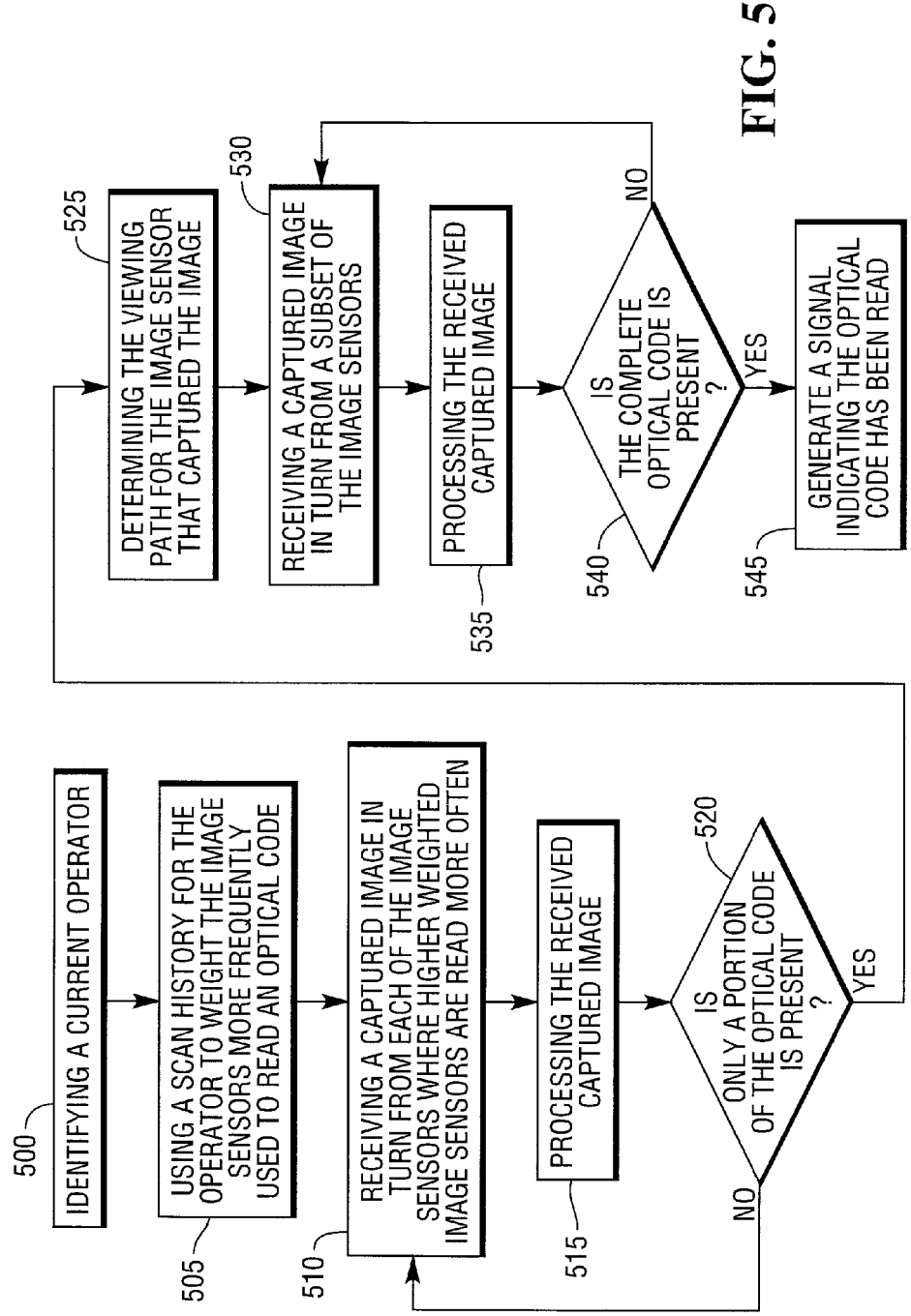
FIG. 5 is a high-level flow chart illustrating an exemplar method for reading an optical code using multiple image sensors using one processor and a scan history.

Turning to FIG. 5, there is provided a high-level flow chart illustrating another exemplar method for reading an optical code using multiple image sensors using a single processor and a scan history. This example is similar to the example of FIG. 4 but includes the use of a scan history for an operator of the optical code scanner 105. Operators tend to exhibit certain repeated behaviors when scanning an optical code 250. For example, one operator may generally direct all optical codes 250 toward the vertical scanning window 220 where another operator may generally direct all optical codes 250 toward the horizontal scanning window 215. Once these behaviors have been identified for an operator, they can be used to predict which of the image sensors 165, 170, 175, 180 have a higher probability of capturing a complete optical code 250 for that operator.

In step 500, the current operator of the optical code scanner 105 is identified. This is accomplished for example by requiring the operator to enter a code or scan an identification card (i.e., a loyalty card or employee ID). In step 505, the processor 120 uses a scan history for the identified operator to identify which of the image sensors 165, 170, 175, 180 have more frequently in the past been able to capture an entire image of an optical code and assigns a higher weighting value to these image sensors. A higher weighting value for an image sensor causes that image sensor to be selected for reading more often than an image sensor with a lower weighting value.

In step 510, the processor 120 receives or reads a captured image in turn from each of the image sensors 165, 170, 175, 180 where image sensors having a higher weighting value are selected for reading more often that image sensors having a lower weighting value. Using this method, each of the image sensors 165, 170, 175, 180 are read at least once during a period of time but some of the image sensors are read more than once during the period of time depending on the weighting value assigned to each image sensor. Higher weighting values cause an image sensor to be read more often than an image sensor with a lower weighting value. The weighting values are assigned based on the operators scan history. In one embodiment, the period of time is set to allow the reading of 6 images. Since there are four image sensors, 2 of the image sensors are read twice each while the other two image sensors are only read once each. The image sensors with the highest weighting values are read twice.

In step 515, the received captured image is processed to determine if only a portion of the optical code 250 has been captured. In step 520, if no portion of an optical code 250 is found in the captured image, control is transferred back to step 510 where a captured image from a different one of the image sensors 165, 170, 175, 180 is received for processing. If only a portion of the optical code 250 is found, control is transferred to step 525.

In step 525, the processor 120 determines the viewing path for the image sensor that captured the image containing only the portion of the optical code 250 and identifies a subset of the image sensors 165, 170, 175, 180 that have a viewing path to the same general area of the optical code scanner 105 as the viewing path of the image sensor that captured the portion of the optical code 250. The subset of the image sensors includes the image sensor that captured the portion of the optical code 250 and at least one other image sensor whose viewing path passes through a different scanning window than the image sensor that captured the portion of the optical code 250.

In step 530, the processor 120 receives in turn a captured image from one of the subset of image sensors. The processor 120 uses a round-robin method to read in turn a captured image from each of the subset of image sensors.

In step 535, the processor 120 processes the received captured image and determines if a complete optical code 250 has been captured. In step 540, if a complete optical code 250 has not been captured, control is transferred back to step 530. If a complete optical code 250 has been captured, control is transferred to step 545. In step 545, the processor 120 generates a signal indicating the optical code 250 has been read. The signal includes information read from the optical code 250.

Although particular reference has been made to an embodiment that includes an optical code scanner and examples have been provided illustrating the invention using an imaging scanner with four image sensors, certain other embodiments, variations and modifications are also envisioned within the spirit and scope of the following claims. For example, there are embodiments where the imaging scanner includes two or more image sensors where a single processor processes captured images from each of the image sensors. In still other embodiments, more than one processor is used to process captured images but each processor processes images from more than one image sensor.

I claim:
1. An optical code scanner comprising:
a plurality of image sensors each adapted to capture an image of an optical code;
a memory adapted to store a program and a captured image of an optical code from one of the plurality of image sensors; and
a single processor in communication with the plurality of image sensors and the memory where the program when executed by the processor causes the processor to control the optical code scanner including receiving and processing captured images from each of the plurality of image sensors using a round-robin approach that determines a processing sequence for handling the captured images with equal weights for each handled captured image until a portion of the optical code is detected, and wherein the single processor is configured to ensure that each image sensor is read one before any particular image sensor is read a second time.

2. The optical code scanner of claim 1, wherein after the portion of the optical code is detected, the processor only receives and processes captured images from a subset of the plurality of image sensors using the round-robin approach until the entire optical code is detected in one of the captured images and read.

3. The optical code scanner of claim 2, wherein the subset of the plurality of image sensors includes only image sensors adapted to capture an image from a first area of the optical code scanner that includes a second area that the image sensor that captured the portion of the optical code is adapted to capture images from.

4. The optical code scanner of claim 2, wherein the subset of the plurality of image sensors includes only image sensors receiving an image for capture from the same general direction as the image sensor that captured the portion of the optical code.

5. The optical code scanner of claim 1, further including a vertical scanning window and a horizontal scanner window.

6. The optical code scanner of claim 4, wherein at least one of the plurality of image sensors receives an image for capture through a vertical scanning window and at least one of the plurality of image sensors receives an image for capture through a horizontal scanning window.

7. The optical code scanner of claim 6, wherein at least one of the subset of the plurality of image sensors receives an image for capture through a different scanning window than the image sensor that captured the portion of the optical code.

8. The optical code scanner of claim 2, further including a communications controller controlled by the processor and where the communications controller transmits information external to the optical code scanner about the optical code after it is read.

9. A computer implemented method for use in an optical code scanner including a single processor and a plurality of image sensors that capture and image of an optical code presented to the optical code scanner, the method comprising:
   a) receiving a captured image in a sequence defined by a round robin approach with an equal weight from one of the plurality of image sensors;
   b) processing the received captured image to determine whether the captured image contains only a portion of the optical code and if the received captured image does not contain the portion of the optical code repeating steps a-b and if the received captured image does contain the portion of the optical code continuing to step c;
   c) determining a viewing path of the image sensor that captured the image containing the portion of the optical code;
   d) receiving a captured image in turn, using a round-robin method, from a subset of the plurality of image sensors;
   e) processing the received captured image from step d to determine whether the captured image contains the complete optical code and if the received captured image does not contain the complete optical code repeating steps d-e but only after each image sensor has at least been read once and if the received captured image does contain the complete optical code generating a signal indicating the optical code has been read.

10. The method of claim 9, wherein the subset of the plurality of image sensors comprises only image sensors that have a viewing path directed to the same general area of the optical code scanner as the viewing path of the image sensor that capture the image containing the portion of the optical code.

11. The method of claim 9, wherein the subset of the plurality of image sensors comprises only image sensors receiving an image for capture from the same general direction as the image sensor that captured the portion of the optical code.

12. The method of claim 9, step "a" wherein at least one of the plurality of image sensors captures an image through a vertical scanning window and at least one of the plurality of image sensors captures an image through a horizontal scanning window.

13. The method of claim 12, step "d" wherein at least one of the subset of the plurality of image sensors captures an image through a scanning window that is different from the scanning window used by the image sensor that captured the portion of the optical code.

14. The method of claim 9, step "a" wherein the round-robin method assigns an equal selection weighting for each of the plurality of image sensors.

15. The method of claim 14, step "a" wherein the round-robin method is modified from the equal selection weighting for each of the plurality of image sensors to an increased selection weighting for the image sensors of the plurality of image sensors that more frequently read the optical code.

16. The method of claim 15, further comprising identifying an operator scanning the optical code at the optical code scanner.

17. The method of claim 16, wherein step "a" further comprises using a scan history for the operator to determine which image sensor more frequently reads the optical code.

18. A point of sale system comprising:
   a point of sale terminal;
   an optical code scanner in communication with the point of sale terminal, the optical code scanner including:
      a plurality of image sensors each adapted to capture an image of an optical code;
      a memory adapted to store a program and a captured image of an optical code from one of the plurality of image sensors; and
      a single processor in communication with the plurality of image sensors and the memory where the program when executed by the processor causes the processor to control the optical code scanner including receiving and processing captured images from each of the plurality of image sensors, each image sensor read once before any particular image sensor is read a second time, and the sequence for processing the captured images defined by weights assigned to each of the image sensors and a highest weight for a first captured image based on a particular sensor that an operator of the optical code scanner is known to access more frequently based on repeated behavior of that operator captured in a scan history for the operator of the optical code scanner, the captured images processed until a portion of the optical code is detected.

19. The system of claim 18, wherein after the portion of the optical code is detected, the processor receives and processes captured images from a subset of the plurality of image sensors until the entire optical code is detected in one of the captured images and read.

20. The system of claim 19, wherein the subset of the plurality of image sensors includes only image sensors adapted to capture an image from the same general area of the optical code scanner as the image sensor that captured the portion of the optical code.

* * * * *